(12) United States Patent
Nakagawa et al.

(10) Patent No.: US 6,946,084 B2
(45) Date of Patent: Sep. 20, 2005

(54) THERMOPLASTIC RESIN COMPOSITION AND MOLDINGS OF THE SAME

(75) Inventors: Matsuyoshi Nakagawa, Sodegaura (JP); Takaaki Miyoshi, Kimitsu (JP); Kazuya Noda, Chigasaki (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 64 days.

(21) Appl. No.: 10/722,450

(22) Filed: Nov. 28, 2003

(65) Prior Publication Data

US 2004/0157978 A1 Aug. 12, 2004

Related U.S. Application Data

(63) Continuation-in-part of application No. 10/478,413, filed as application No. PCT/JP02/04913 on May 21, 2002.

(51) Int. Cl.$^7$ .............................. C08L 77/00; C08L 71/12
(52) U.S. Cl. .......................................... 252/500; 525/89
(58) Field of Search ............................. 525/89; 252/500

(56) References Cited

U.S. PATENT DOCUMENTS

| 3,379,792 A | | 4/1968 | Finholt et al. |
| 4,315,086 A | | 2/1982 | Ueno et al. |
| 5,104,937 A | * | 4/1992 | Saito et al. ............... 525/89 |
| 5,262,480 A | * | 11/1993 | Lee, Jr. ............... 525/92 D |
| 6,797,766 B2 | | 9/2004 | Cordova |

FOREIGN PATENT DOCUMENTS

| JP | 45-000997 B | 1/1970 |
| JP | 64-079258 A | 3/1989 |
| JP | 02-058563 A | 2/1990 |
| JP | 6-157895 A | 6/1994 |
| JP | 6-240130 A | 8/1994 |
| JP | 7-179747 A | 7/1995 |
| JP | 8-217972 A | 8/1996 |
| WO | WO 02/094936 A1 | 11/2002 |

* cited by examiner

*Primary Examiner*—Ana Woodward
(74) *Attorney, Agent, or Firm*—Birch, Stewart, Kolasch & Birch, LLP

(57) ABSTRACT

The present invention provides a thermoplastic resin composition remarkably improved in toughness, particularly, tensile elongation and multiaxial impact strength, while maintaining the flowability and heat resistance of polyamide/polyphenylene ether alloys.

A composition comprising a polyamide, a polyphenylene ether and a block copolymer, wherein the block copolymer is a mixture of two or more block copolymers comprising a block copolymer containing a polymer block mainly composed of an aromatic vinyl compound in an amount of 55 weight % or more but less than 90 weight % and a block copolymer containing a polymer block mainly composed of an aromatic vinyl compound in an amount of 20 weight % or more but less than 55 weight %, and one of the polymer block mainly composed of an aromatic vinyl compound in the mixture has a number average molecular weight of 10,000 or more but less than 30,000 and one of the polymer block mainly composed of a conjugated diene compound in the mixture has a number average molecular weight of 50,000 or more but less than 100,000.

7 Claims, No Drawings

THERMOPLASTIC RESIN COMPOSITION AND MOLDINGS OF THE SAME

CROSS-REFERENCE TO RELATED APPLICATION

This application is a continuation-in-part of our co-pending application, Ser. No. 10/478,413, filed on Nov. 21, 2003, which is a 371 of PCT/JP02/04913 filed on May 21, 2002, the content of which is incorporated herein by reference.

BACKGROUND OF THE INVENTION (1) Field of the Invention

The present invention relates to a resin composition markedly improved, particularly, in tensile elongation and multi-axial impact strength as well as Izod impact strength while retaining flowability and heat resistance, and further relates to injection moldings made from the resin composition.

(2) Description of the Related Art

A polyphenylene ether has been extensively used because of superiority in its mechanical properties, electrical properties and heat resistance and further superiority in its dimensional stability. However, polyphenylene ether has a serious defect that it is inferior in oil resistance and molding processability when used singly. In order to dissolve the defect, JP-B-45-997 proposes a technique, wherein a polyamide is blended with polyphenylene ether. At present, such a material has come to be extensively used for various applications.

A technique of adding an impact improving material to a polymer alloy comprising a polyphenylene ether and a polyamide in order to impart impact resistance is disclosed in U.S. Pat. No. 4,315,086. Examples of the impact improving material disclosed therein include di-block copolymers or tri-block copolymers of ethylene propylene rubber, SBR, polybutadiene or polystyrene-diene rubber or partial hydrides thereof.

JP-A-2-58563 discloses a technique, wherein two kinds of elastomers, namely, an ABA type tri-block copolymer and an AB type di-block copolymer are blended with each other, to improve impact resistance.

Further, JP-A-6-240130 discloses a technique, wherein two or more block copolymers having different weight ratios of an aromatic vinyl compound block are blended, to improve molding processability, mechanical properties and heat resistance.

In recent years, compositions comprising the polyamide/polyphenylene ether alloy have been used for the applications, such as a relay block, which is one of the car electrical device parts, or for doors and fenders which are exterior trim parts of cars. In these applications, it is required to particularly enhance multi-axial impact strength, such as falling weight impact strength, among impact strengths. The improvement of the multi-axial impact strength is extremely difficult because this must be achieved while substantially retaining other important properties such as flowability and heat resistance.

WO 02/094936 discloses a technique wherein deterioration of surface appearance and generation of black spots at the time of production can be inhibited while retaining Izod impact strength after heat exposure by using more than one block copolymers different in molecular weight.

Hitherto, impact strength has generally been evaluated by the method called shock fracture toughness, such as (notched) Izod impact test. This is an impact test under mechanical conditions which are severe for materials or articles, and the resulting values do not necessarily show the practical impact strength of the materials or articles. Rather, as described in "Impact Resistance of Plastics" (written by Ikuo Narusawa, published from Sigma Publishing Co., p.1–4), tensile tests or multi-axial impact tests which measure responses with reflecting as much as possible the properties of materials without notching are often regarded to correspond well to the practical impact strength.

According to the above-mentioned conventional techniques, these problems cannot sufficiently be solved. With the expansion of applications, it has been desired to improve impact strength, corresponding to car crash or falling of containers, particularly, multi-axial impact strength, while maintaining flowability and heat resistance.

The object of the present invention is to provide a thermoplastic resin composition improved in impact characteristics corresponding to car crash or falling of containers, particularly, tensile elongation and multi-axial impact strength, while maintaining flowability and heat resistance of polyamide/polyphenylene ether alloys, and further to provide moldings made from the composition.

SUMMARY OF THE INVENTION

As a result of intensive research conducted by the inventors in an attempt to solve the above problems, it has been found that a thermoplastic resin composition remarkably improved in toughness, particularly, tensile elongation and multi-axial impact strength, while maintaining flowability and heat resistance and furthermore moldings of the said composition can be obtained when two or more block copolymers are used in combination and the number-average molecular weight of one polymer block mainly composed of an aromatic vinyl compound and that of one polymer block mainly composed of a conjugated diene compound are set within optimum ranges.

That is, the present invention relates to a thermoplastic resin composition comprising:

(A) 50 to 90 parts by weight of a polyamide,
(B) 50 to 10 parts by weight of a polyphenylene ether, and
(C) 1 to 35 parts by weight of a block copolymer comprising at least one polymer block mainly composed of an aromatic vinyl compound and at least one polymer block mainly composed of a conjugated diene compound, and/or the block copolymer which is hydrogenated, wherein the weight is based on 100 parts by weight of the sum of (A) and (B), characterized in that the component (C) is a mixture of two or more block copolymers comprising (C1) a block copolymer containing a polymer block mainly composed of an aromatic vinyl compound in an amount of 55% by weight or more but less than 90% by weight and (C2) a block copolymer containing a polymer block mainly composed of an aromatic vinyl compound in an amount of 20% by weight or more but less than 55% by weight, and one of the polymer block mainly composed of an aromatic vinyl compound in the mixture has a number average molecular weight of 10,000 or more but less than 30,000 and one of the polymer block mainly composed of a conjugated diene compound in the mixture has a number average molecular weight of 50,000 or more and less than 100,000. The present invention further relates to moldings of the above thermoplastic resin composition.

The thermoplastic resin composition and moldings comprising the thermoplastic resin composition can be improved in impact characteristics against car crash of, such as tensile elongation and multi-axial impact strength, while maintaining flowability and heat resistance.

PREFERRED EMBODIMENTS OF THE INVENTION

Respective components that can be used in the present invention are described in detail hereinbelow.

The polyamide resin used in the present invention as the component (A) includes a polycondensate of a dibasic acid and a diamine, a ring opening polymerization product of a cyclic lactam, a polycondensate of an aminocarboxylic acid, and a copolymer and a blend of thereof. More specifically, aliphatic polyamide resins such as polyamide 66, polyamide 46, polyamide 612, polyamide 610, polyamide 6, polyamide 11 and polyamide 12; aliphatic and aromatic polyamide resins such as poly-m-xyleneadipamide (polyamide MXD6), polyhexamethyleneterephthalmide (polyamide 6T), and polyhexamethyleneisophthalamide (polyamide 6I); and copolymers or blends thereof may be used. In the present invention, polyamide 66, polyamide 6, polyamide 66/6 and polyamide 66/6I are especially preferred because they are superior in heat resistance and mechanical strength. Most preferred are polyamide 66, polyamide 6 and a mixture thereof.

The polymerization degree of the polyamide resin (A) used in the present invention is not particularly limited, but from the point of usual injection molding processability, the relative viscosity is preferably 2.0 or more, more preferably 2.2–3.0, as determined at 25° C. in a 98% sulfuric acid solution in accordance with JIS K6810. The polyamide resin (A) used in the present invention is not limited to these polyamide resins and may be a mixture of more than one polyamide resins having different molecular weights.

The polymerization method for the polyamide resins used in the present invention is not particularly limited, but can be any of melt polymerization, interfacial polymerization, solution polymerization, bulk polymerization, solid polymerization and combination of these polymerization methods. Among them, melt polymerization is more preferred.

The terminal groups of the polyamide participate in the reaction with a functional polyphenylene ether. Usually, the polyamide resin has an amino group and a carboxyl group as the terminal groups. Generally speaking, an increase of carboxyl group concentration lowers impact resistance but raises flowability, while an increase of amino group concentration raises impact resistance but lowers flowability.

In the present invention, a ratio of such terminal groups in terms of amino group/carboxyl group concentration ratio is preferably from 9/1 to 1/9, more preferably from 8/2 to 1/9, further preferably from 6/4 to 1/9.

The concentration of the carboxyl group is preferably higher by at least 30 milli-equivalent/kg than the concentration of the amino group. Moreover, the concentration of the terminal amino group is preferably at least 10 milli-equivalent/kg, and more preferably 30 milli-equivalent/kg or more.

Such terminal groups of the polyamide resin can be controlled in a known manner obvious to a person skilled in the art. For example, a technique wherein diamines, dicarboxylic acids, monocarboxylic acids, etc. are added at the time of the polymerization of the polyamide resin so as to obtain a pre-determined terminal group concentration.

In the present invention, a metal stabilizer, which is known to be used for improving heat stability of the polyamide resin, such as those described in JP-A-1-163262, can be used without any problem.

Particularly preferable examples of the metal stabilizer include CuI, $CuCl_2$, copper acetate, cerium stearate, and the like. In addition, alkali metal halides, such as potassium iodide, potassium bromide and the like, can also be suitably used. Naturally, it is permitted that more than one stabilizers are used at the same time.

The metal stabilizer and/or the alkali metal halide may be added in a total amount of preferably from 0.001 to 1 part by weight with respect to 100 parts by weight of the polyamide resin.

Furthermore, known additives which can be added to the polyamide may be added in an amount of less than 10 parts by weight with respect to 100 parts by weight of the polyamide.

The polyphenylene ether (B) that can be used in the present invention is a homopolymer and/or a copolymer comprising a structural unit of the following formula (1),

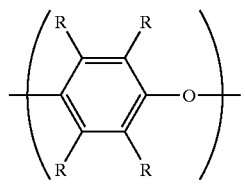

[wherein O represents an oxygen atom, and each R independently represents hydrogen, halogen, primary or secondary lower alkyl, phenyl, haloalkyl, aminoalkyl, hydrocarbyloxy or halohydrocarbyloxy in which the halogen atom and the oxygen atom are separated from each other by at least two carbon atoms].

Specific examples of the polyphenylene ether (B) in the present invention include poly(2,6-dimethyl-1,4-phenylene ether), poly(2-methyl-6-ethyl-1,4-phenylene ether), poly(2-methyl-6-phenyl-1,4-phenylene ether), poly(2,6-dichloro-1,4-phenylene ether), etc. In addition, polyphenylene ether copolymers, such as a copolymer of 2,6-dimethylphenol and another phenol (for example, a copolymer of 2,6-dimethylphenol and 2,3,6-trimethylphenol, and a copolymer of 2,6-dimethylphenol and 2-methyl-6-butylphenol, as described in JP-B-52-17880).

Among these, particularly preferred polyphenylene ethers include poly(2,6-dimethyl-1,4-phenylene ether), a copolymer of 2,6-dimethylphenol and 2,3,6-trimethylphenol and a mixture thereof.

As to the ratio of respective monomer units in the case of using a copolymer of 2,6-dimethylphenol and 2,3,6-trimethylphenol as the polyphenylene ether, an especially preferable copolymer is a copolymer comprising about 80 to about 90 weight % of 2,6-dimethylphenol and about 10 to about 20 weight % of 2,3,6-trimethylphenol when the total amount of the polyphenylene ether is assumed to be 100 weight %.

A method for producing the polyphenylene ether (B) used in the present invention is not particularly limited as far as it is already known. For example, the production processes described in U.S. Pat. Nos. 3,306,874; 3,306,875; 3,257,357 and 3,257,358; JP-A-50-51197 and JP-A-63-152628 are included.

The polyphenylene ether (B) that can be used in the present invention has a reduced viscosity (η sp/c: measured in a 0.5 g/dl chloroform solution at 30° C.) ranging preferably from 0.15 to 0.70 dl/g, more preferably from 0.20 to 0.60 dl/g, and further more preferably from 0.40 to 0.55 dl/g.

In the present invention, a mixture of two or more polyphenylene ethers having different reduced viscosity can be used without any problem. Examples thereof include, but are not limited to, a mixture of a polyphenylene ether having a reduced viscosity of 0.45 dl/g or less and a polyphenylene ether having a reduced viscosity of 0.50 dl/g or more, and a mixture of a low molecular weight polyphenylene ether having a reduced viscosity of 0.40 dl/g. or less and a polyphenylene ether having a reduced viscosity of 0.50 dl/g or more.

Further, it is permitted that the polyphenylene ether (B) that can be used in the present invention is a polyphenylene ether modified in its entirety or in part.

The modified polyphenylene ether referred to herein is a polyphenylene ether modified with at least one modifying compound having at least one carbon-carbon double or triple bond and at least one carboxylic acid group, acid anhydride group, amino group, hydroxyl group or glycidyl group in its molecular structure.

The processes for producing the modified polyphenylene ether include, for example, (1) a process comprising reacting a polyphenylene ether with a modifying compound in the presence or absence of a radical initiator at a temperature of 100° C. or more but lower than the glass transition temperature of the polyphenylene ether while keeping the polyphenylene ether non-melted, (2) a process comprising melt-kneading a polyphenylene ether and a modifying compound in the presence or absence of a radical initiator, at a temperature in the range from the glass transition temperature of the polyphenylene ether to 360° C., and (3) a process comprising reacting a polyphenylene ether with a modifying compound in a solution in the presence or absence of a radical initiator at a temperature lower than the glass transition temperature of the polyphenylene ether. Of these processes, the processes (1) and (2) are preferred.

Next, at least one modifying compound having at least one carbon-carbon double or triple bond and at least one carboxylic acid group, acid anhydride group, amino group, hydroxyl group or glycidyl group in its molecular structure is described in detail as follows.

Examples of the modifying compound having a carbon-carbon double and a carboxylic acid group or an acid anhydride group in the molecule at the same time include maleic acid, fumaric acid, chloromaleic acid, cis-4-cyclohexene-1,2-dicarboxylic acid and their acid anhydrides. Of these, preferred are fumaric acid, maleic acid and maleic anhydride, and particularly preferred are fumaric acid and maleic anhydride.

Further, it is possible to use a compound wherein one or two carboxylic acid group(s) in these unsaturated dicarboxylic acids is(are) formed into an ester(s).

Examples of the modifying compound having a carbon-carbon double bond and a glycidyl group in the molecule at the same time include allyl glycidyl ether, glycidyl acrylate, glycidyl methacrylate and epoxydized natural fats and oils. Of these, particularly preferred are glycidyl acrylate and glycidyl methacrylate.

Examples of the modifying compound having a carbon-carbon double bond and a hydroxyl group in the molecule at the same time include unsaturated alcohols of the general formula, $C_nH_{2n-3}OH$ (n is a positive integer), such as allyl alcohol, 4-penten-1-ol and 1,4-pentadien-3-ol, and other unsaturated alcohols of the general formula, $C_nH_{2n-5}OH$ or $C_nH_{2n-7}OH$ (n is a positive integer).

The above-mentioned modifying compounds may be used singly or in combination of two or more thereof.

In the production of the modified polyphenylene ether, the modifying compound is added in an amount of preferably from 0.1 to 10 parts by weight, and more preferably from 0.3 to 5 parts by weight, with respect to 100 parts by weight of the polyphenylene ether.

In the production of the modified polyphenylene ether in the presence of a radical initiator, the radical initiator is used in an amount of preferably from 0.001 to 1 part by weight with respect to 100 parts by weight of the polyphenylene ether.

The addition rate of the modifying compound in the modified polyphenylene ether is preferably from 0.01 to 5 weight %, and more preferably from 0.1 to 3 weight %.

It is permitted that an unreacted modifying compound and/or a polymer of the modifying compound remain(s) in the modified polyphenylene ether.

Further, if desired, it is permitted that a compound having an amide bond and/or an amino group is added at the time of production of the modified polyphenylene ether in order to decrease the amount of the residual modifying compound and/or the polymer of the modifying compound in the modified polyphenylene ether.

The compound having an amide bond referred to herein is a compound having an amide bond {—NH—C(=O)—} in its molecular structure. The compound having an amino group is a compound having an amino group {—NH$_2$} at its terminal. Specific examples of these compounds include, but are not limited to, aliphatic amines, such as octylamine, nonylamine, tetramethylenediamine and hexamethylenediamine; aromatic amines, such as aniline, m-phenylenediamine, p-phenylenediamine, m-xylylenediamine and p-xylylenediamine; reaction products between the above-mentioned amines and carboxylic acids, dicarboxylic acids or the like; lactams, such as ε-caprolactam; and polyamide resins.

These compounds having an amide bond or an amino group, if added, are used in an amount of preferably 0.001 part by weight or more but less than 5 parts by weight, more preferably 0.01 part by weight or more but less than 1 part by weight, and further more preferably 0.01 part by weight or more but less than 0.1 part by weight, with respect to 100 parts by weight of the polyphenylene ether.

In addition, in the present invention, it is permitted to add a styrenic thermoplastic resin, provided that the amount thereof is less than 50 parts by weight with respect to 100 parts by weight of the sum of the polyamide (A) and the polyphenylene ether (B).

Examples of the styrenic thermoplastic resin referred to in the present invention include styrene homopolymer, rubber modified polystyrene (HIPS), styrene-acrylonitrile copolymers (AS resin) and styrene-rubbery polymer-acrylonitrile copolymers (ABS resin), etc.

Furthermore, it is permitted that known additives safely added to the polyphenylene ether are added, provided that the amount thereof is less than 10 parts by weight with respect to 100 parts by weight of the polyphenylene ether.

Next, the block copolymer (C) that can be used in the present invention is described in detail.

The block copolymer (C) that can be used in the present invention is a block copolymer comprising at least one polymer block mainly composed of an aromatic vinyl compound and at least one polymer block mainly composed of a conjugated diene compound.

Specific examples of the aromatic vinyl compound include styrene, α-methylstyrene and vinyltoluene, etc. At least one compound selected therefrom is used. Of these, particularly preferred is styrene.

Specific examples of the conjugated diene compound include butadiene, isoprene, piperylene and 1,3-pentadiene, etc. At least one compound selected therefrom is used. Of these, preferred are butadiene, isoprene and a combination thereof.

When butadiene is used as the conjugated diene for the block copolymer, it is preferred that a 1,2-vinyl content or a total content of a 1,2-vinyl content and a 3,4-vinyl content in the micro structure of the polybutadiene block portion is from 5 to 80%, more preferably from 10 to 50%, and much more preferably from 15 to 40%.

As the block copolymer in the present invention, it is preferred that the block copolymer has a bonding type selected from a-b, a-b-a and a-b-a-b types, wherein (a) is the polymer block mainly composed of the aromatic vinyl compound and (b) is the polymer block mainly composed of the conjugated diene compound.

Among these, more preferred is a-b-a type. It is permitted that it is a combination of these bonding types.

Further, it is more preferred that the block copolymer of the aromatic vinyl compound and the conjugated diene compound that can be used in the present invention is a hydrogenated block copolymer. The hydrogenated block copolymer is obtained by hydrogenating the block copolymer of the aromatic vinyl compound and the conjugated diene compound, so that the percentage of aliphatic double bonds in the polymer block mainly composed of the conjugated diene is controlled to be within a range of from more than 0 to 100%. The hydrogenation rate in the hydrogenated block copolymer is preferably 50% or more, more preferably 80% or more, and the most preferably 98% or more.

The block copolymer used may be a mixture of the non-hydrogenated block copolymer and the hydrogenated block copolymer.

In the present invention, it is necessary that the block copolymer of the component (C) is a mixture of two or more block copolymers comprising (C1) a block copolymer containing a polymer block mainly composed of an aromatic vinyl compound in an amount of 55 weight % or more but less than 90 weight % and (C2) a block copolymer containing a polymer block mainly composed of an aromatic vinyl compound in an amount of 20 weight % or more but less than 55 weight %.

Furthermore, it is necessary that one of the polymer block mainly composed of an aromatic vinyl compound in the mixture has a number average molecular weight of 10,000 or more but less than 30,000 and one of the polymer block mainly composed of a conjugated diene compound in the mixture has a number average molecular weight of 50,000 or more but less than 100,000. It is more preferred that one of the polymer block mainly composed of an aromatic vinyl compound in the mixture of the block copolymers has a number average molecular weight of 10,000 or more but less than 25,000 and one of the polymer block mainly composed of a conjugated diene compound in the mixture has a number average molecular weight of 50,000 or more but less than 80,000.

The term "mainly composed of" in the polymer block mainly composed of an aromatic vinyl compound of the present invention means that at least 50 weight % of the block is the aromatic vinyl compound. The content of the aromatic vinyl compound thereof is more preferably 70 weight % or more, more preferably 80 weight % or more, and most preferably 90 weight % or more. The same applies to the term "mainly composed of" in the polymer block mainly composed of a conjugated diene compound, and the term means that at least 50 weight % of the block is the conjugated diene compound. The content of the conjugated diene compound thereof is more preferably 70 weight % or more, more preferably 80 weight % or more, and most preferably 90 weight % or more.

Even in the case where the block is, for example, an aromatic vinyl compound block to which a small amount of the conjugated diene compound or other compound is randomly bonded, as long as the aromatic vinyl compound conprises 50 weight % of the block, this is regarded to be a block copolymer mainly composed of an aromatic vinyl compound. The same applies to the block copolymer mainly composed of a conjugated diene compound.

In order to develop the effect of the invention to remarkably improve toughness, particularly, tensile elongation and multi-axial impact strength while retaining flowability and heat resistance, it is important that the number average molecular weight of one polymer block mainly composed of the aromatic vinyl compound in the mixture of two or more block copolymers comprising the component (C1) and the component (C2) and the number average molecular weight of one polymer block mainly composed of the conjugated diene compound in the mixture are adjusted to the above-mentioned ranges.

The number average molecular weight of one polymer block mainly composed of the aromatic vinyl compound in the block copolymers and the number average molecular weight of one polymer block mainly composed of the conjugated diene compound in the mixture can be calculated from the number average molecular weights of the respective block copolymers of the component (C) and weight % of all the polymer blocks mainly composed of the aromatic vinyl compound in the block copolymers and weight % of all the polymer blocks mainly composed of the conjugated diene compound in the block copolymers.

Specifically, the number average molecular weights of the respective block copolymers of the component (C) referred to in the present invention are obtained by a gel permeation chromatography measurement apparatus (GPC SYSTEM 21, manufactured by Showa Denko K.K.) with an ultraviolet spectral detector (UV-41, manufactured by Showa Denko K.K.) and converting the measurement based on the polystyrene standard. [solvent: chloroform; temperature: 40° C.; column: sample side (K-G, K-800RL, K-800R), reference side (K-805L×2); flow: 10 ml/min; measurement wavelength: 254 nm; pressure: 15 to 17 kg/cm$^2$]. In the measurement, a low molecular weight component owing to catalyst deactivation in the course of polymerization may be detected. In such a case, the low molecular weight component is not incorporated in the molecular weight calculation.

The number average molecular weight of a block copolymer contained in the composition can be obtained, for example, in the following manner. A pellet is sliced to a thickness of 20 to 50 $\mu$m by a microtome, and the slices are dipped in chloroform and subjected to extraction for about 1 hour using a thermostatic shaking machine set at about 80° C. to dissolve polyphenylene ether and the block copolymer in chloroform. The solution is subjected to filtration and methanol is dripped into the filtrate in an amount of three times the amount of the filtrate to cause reprecipitation, followed by vacuum drying. The resulting powdery sample is further dissolved in methylene chloride, and the solution is left to stand for 12 hours in an environment of −10° C. The precipitated component (polyphenylene ether component) is filtered off, and the filtrate is subjected to measurement by the gel permeation chromatography measurement apparatus to determine the number average molecular weight.

The number average molecular weight of the polymer block mainly composed of the aromatic vinyl compound in one kind of the block copolymer can be obtained by the following equation using the above-mentioned number average molecular weight of the block copolymer, $$Mn_{(a),n} = \{Mn \times a/(a+b)\}/N_{(a)} \quad (1)$$

wherein $Mn_{(a),n}$ is the number average molecular weight of one polymer block mainly composed of the aromatic vinyl compound in the block copolymer n, Mn is the number average molecular weight of the block copolymer n, a is the weight % of the polymer block mainly composed of the aromatic vinyl compound in the block copolymer n, b is the weight % of the polymer block mainly composed of the conjugated diene compound in the block copolymer n, and $N_{(a)}$ is the number of the polymer block mainly composed of the aromatic vinyl compound in the block copolymer n.

Furthermore, since the block copolymer of the component (C) is a mixture of two or more block copolymers comprising the component (C1) and the component (C2), the number average molecular weight of one polymer block mainly composed of the aromatic vinyl compound in the mixture can be obtained by the following equation, $$Mn_{(a),av} = \Sigma(Mn_{(a),n} \times Cn) \quad (2)$$

wherein $Mn_{(a),av}$ is the number average molecular weight of one polymer block mainly composed of the aromatic vinyl compound in the mixture of the block copolymers, $Mn_{(a),n}$ is the number average molecular weight of one polymer block mainly composed of the aromatic vinyl compound of the block copolymer n, Cn is a weight fraction of the block copolymer n in the mixture of the block copolymers. On the other hand, the number average molecular weight of one polymer block mainly composed of the conjugated diene compound in one kind of the block copolymer can be obtained by the following equation using the above-mentioned number average molecular weight of the block copolymer, $$Mn_{(b),n} = \{Mn \times b/(a+b)\}/N_{(b)} \quad (3)$$

wherein $Mn_{(b),n}$ is the number average molecular weight of one polymer block mainly composed of the conjugated diene compound in the block copolymer n, Mn is the number average molecular weight of the block copolymer n, a is the weight % of the polymer block mainly composed of the aromatic vinyl compound in the block copolymer n, b is the weight % of the polymer block mainly composed of the conjugated diene compound in the block copolymer n, and $N_{(b)}$ is the number of the polymer block mainly composed of the conjugated diene compound in the block copolymer n.

Furthermore, since the block copolymer of the component (C) is a mixture of two or more block copolymers comprising the component (C1) and the component (C2), the number average molecular weight of one polymer block mainly composed of the conjugated diene compound in the mixture can be obtained by the following equation, $$Mn_{(b),av} = \Sigma(Mn_{(b),n} \times Cn) \quad (4)$$

wherein $Mn_{(b),av}$ is the number average molecular weight of one polymer block mainly composed of the conjugated diene compound in the mixture of the block copolymers, $Mn_{(b),n}$ is the number average molecular weight of one polymer block mainly composed of the conjugated diene compound of the block copolymer n, Cn is a weight fraction of the block copolymer n in the mixture of the block copolymers.

Moreover, when the component (C) in the present invention is a mixture composed of block copolymers having a number average molecular weight of less than 120,000, decrease in flowability can be inhibited, and hence such component (C) is more preferred.

In the present invention, it is more preferred that the molar ratio of the component (C1) and the component (C2), $N_{(C1)}/N_{(C2)}$, is in the range of 0.2 to 1.0. Further preferably, the molar ratio is in the range of 0.2 to 0.6.

When the molar ratio of the component (C1) and the component (C2), $N_{(C1)}/N_{(C2)}$, is 0.2 or more, decrease in heat distortion resistance under high load can be inhibited. Further, when the molar ratio $N_{(C1)}/N_{(C2)}$ is 1.0 or less, impact strength can be kept high.

The molar ratio of the component (C1) and the component (C2), $N_{(C1)}/N_{(C2)}$, can be obtained by the following equation using the number average molecular weight of each block copolymer, $$N_{(C1)}/N_{(C2)} = \Sigma(C1_{(n)}/Mn_{(C1,n)}) / \Sigma(C2_{(n)}/Mn_{(C2,n)})$$

wherein $Mn_{(C1,n)}$ is the number average molecular weight of the block copolymer n of the component C1, $Mn_{(C2,n)}$ is the number average molecular weight of the block copolymer n of the component C2, $C1_{(n)}$ is a weight fraction of the block copolymer n of the component C1, and $C2_{(n)}$ is a weight fraction of the block copolymer n of the component C2.

With respect to these aromatic vinyl compound-conjugated diene compound block copolymers, it is permitted to use a mixture of those different from one another in the bonding type, the species of the aromatic vinyl compound, the species of the conjugated diene compound, the 1,2-bond vinyl content, the total of 1,2-bond vinyl content and 3,4-bond vinyl content, the content of the aromatic vinyl compound component or the hydrogenation rate, as long as it is not contrary to the object of the present invention.

Further, it is permitted that the block copolymer used in the present invention is a block copolymer modified in its entirety or in part.

The modified block copolymer referred to herein is a block copolymer modified with at least one modifying compound, having at least one carbon-carbon double or triple bond and at least one carboxylic acid group, acid anhydride group, amino group, hydroxyl group or glycidyl group in its molecular structure.

Examples of a process for producing the modified block copolymer include (1) a process comprising melt-kneading a block copolymer and a modifying compound in the presence or the absence of a radical initiator, at a temperature in the range from the softening point of the block copolymer to 250° C., (2) a process comprising reacting a block copolymer and a modifying compound in a solution in the presence or the absence of a radical initiator at a temperature of the softening point of the block copolymer or lower, and (3) a process comprising carrying out reaction between a block copolymer and a modifying compound in the presence or the absence of a radical initiator at a temperature of the softening point of the block copolymer or lower while keeping both non-melted. Although any of these processes may be used, preferred is the process (1), and the most preferred is the process (1) wherein the reaction is carried out in the presence of a radical initiator.

With respect to the at least one modifying compound having at least one carbon-carbon double or triple bond and at least one carboxylic acid group, acid anhydride group, amino group, hydroxyl group or glycidyl group in its molecular structure, those described hereinabove in connection with the modified polyphenylene ether can be used.

It is permitted that an oil comprising paraffin as the main component is incorporated into the block copolymer in accordance with the present invention in advance. When the oil comprising paraffin as the main component is incorporated in advance, the processability of the resin composition can be improved.

In this case, the oil comprising paraffin as the main component is incorporated in an amount of preferably from 1 to 70 parts by weight with respect to 100 parts by weight of the block copolymer. If the oil is incorporated in an amount of more than 70 parts by weight, the resin composition is inferior in handleability.

The oil comprising paraffin as the main component referred to herein is a mixture of, hydrocarbon compounds having a weight average molecular weight of from 500 to 10,000, which is, a combination of three, i.e. an aromatic ring-bearing compound, a naphthene ring-bearing compound and a paraffinic compound, wherein the content of the paraffinic compound is 50 weight % or more.

A more preferred oil comprising paraffin as the main component is the one composed of 50 to 90 weight % of a paraffinic compound, 10 to 40 weight % of a naphthene ring-bearing compound and 5 weight % or less of an aromatic ring-bearing compound.

Such an oil comprising paraffin as the main component is commercially available. Examples thereof include PW380 manufactured by Idemitsu Kosan Co., Ltd. and so on.

Further, in the present invention, it is permitted to add a conductive material as a component (D).

The conductive material usable in the present invention is preferably non-metallic one such as carbon used for the purpose of imparting conductivity to a non-conductive material.

Examples of the carbon include Ketjen black (EC, EC-600JD) available from Ketjen Black International Co., Ltd. and carbon fibril (BN fibril) available from Hyperion Catalysis International Co., Ltd. Especially preferred is the carbon fibril disclosed in WO94/23433.

The amount of the conductive material is preferably 0.1 part by weight or more but less than 3 parts by weight, more preferably 0.5 part by weight or more but less than 2.5 parts by weight with respect to 100 parts by weight of the sum of the components (A) to (C). If the amount of the conductive material is 3 parts by weight or more, impact resistance and flowability of the thermoplastic resin composition may be deteriorated.

The method of blending the conductive material is not particularly limited, but include, for example, a method of adding the powdery conductive material as it is together with polyphenylene ether, a method of adding the powdery conductive material as it is together with polyamide, and a method of adding the powdery conductive material as it is after the polyamide and the polyphenylene ether are compatibilized as described in U.S. Pat. Nos. 5,741,846 and 5,977,240.

Furthermore, the conductive material may be added in the form of a master batch comprising an elastomer or polyphenylene ether in which the conductive material is incorporated as disclosed in Examples of WO01/81473 or may be added as a mater batch comprising a polyamide in which carbon black is previously uniformly dispersed as disclosed in JP-A-2-201811 or as a carbon fibril master batch such as a polyamide 66/carbon fibril master batch available from Hyperion Catalysis International Co., Ltd. (trade name: Polyamide 66 with Fibril™ Nanotubes RMB4620-00: carbon fibril content 20%).

Further, in the present invention, it is preferred to add a known compatibilizer during the production of the composition.

The main purpose of using a compatibilizer is to improve the physical properties of the polyamide-polyphenylene ether mixture. The compatibilizer that can be used in the present invention is a polyfunctional compound interactive with the polyphenylene ether, the polyamide or both of them. The interaction may be not only chemical (for example, graft formation) but also physical (for example, alteration of the surface characteristics of a dispersed phase).

In any case, the resulting polyamide-polyphenylene ether mixture can exhibit improved compatibility.

Examples of the compatibilizer that can be used in the present invention are described in, for example, WO01/81473, and all of these known compatibilizers can be used alone or in combination.

Among these various compatibilizers, examples of particularly preferred compatibilizers include maleic acid, maleic anhydride and citric acid.

The compatibilizer in the present invention is used in an amount of preferably from 0.01 to 10 parts by weight, more preferably from 0.1 to 5 parts by weight, and most preferably from 0.1 to 1 part by weight with respect to 100 parts by weight of the polyamide-polyphenylene ether mixture.

In the present invention, it is permitted that an additive component other than the components mentioned above is added as far as the effects of the components mentioned above are not impaired.

Examples of the additive components are shown below.

They include other thermoplastic resins, such as polyesters and polyolefins; inorganic fillers (for example, talc, kaolin, xonotlite, wallastonite, titanium oxide, potassium titanate, carbon fiber and glass fiber); silane coupling agents known and used for the purpose of increasing the compatibility of an inorganic filler and a resin; flame retardants (for example, halogenated resins, silicone flame retardants, magnesium hydroxide, aluminum hydroxide, organic phosphoric acid ester compounds, ammonium polyphosphate and red phosphorus); fluorine based polymers exhibiting a drop prevention effect; plasticizers (for example, oils, low molecular weight polyolefins, polyethylene glycol and fatty acid esters); flame retarding assistants, such as antimony trioxide; coloring agents, such as carbon black; antistatic agents; various peroxides; zinc oxide; zinc sulfide; antioxidants; ultraviolet absorbers and photo-stabilizers.

These additive components are added in a total amount not exceeding 100 parts by weight with respect to 100 parts by weight of the sum of the components (A) to (C).

Specific examples of a processing machine used for the production of the composition in accordance with the present invention include, for example, a single screw extruder, a twin screw extruder, a roll, a kneader, the Brabender Plastograph and the Banbury mixer. Of these, a twin screw extruder is preferred, and particularly,. the most preferred is a twin screw extruder equipped with an upstream feed opening and one or more downstream feed openings and having a screw diameter of 45 mm or more and an L/D of 30 or more.

By using a twin screw extruder having a screw diameter of 45 mm or more and an L/D of 30 or more, insufficient kneading can be avoided and desired physical properties (especially, impact strength and tensile elongation) can be obtained.

More specifically, the production method in the present invention includes:

(1) a method wherein a block copolymer and a polyphenylene ether are fed from the upstream feed opening and melt-kneaded, and thereafter a polyamide is fed from the downstream feed opening and melt-kneaded;

(2) a method wherein a part of a block copolymer and a polyphenylene ether are fed from the upstream feed opening and melt-kneaded, and thereafter a polyamide and the remaining block copolymer are fed from the downstream feed opening and melt-kneaded; and (3) a method wherein a polyphenylene ether is fed from the upstream feed opening and melt-kneaded, and thereafter a block copolymer and a polyamide are fed from the downstream feed opening and melt-kneaded, using a twin screw extruder equipped with an upstream feed opening and one or more downstream feed openings. Any of the methods mentioned above may be used.

It is desirable that when the screw length of the extruder is assumed to be 1.0, the downstream feed opening is provided at the position of 0.3–0.8 from the upstream side.

In this case, the melt-kneading temperature is not particularly limited. Usually, a condition at which a suitable composition is obtained can be optionally selected from a range of from 240 to 360° C., but a preferred temperature range is one within which the polyphenylene ether is sufficiently melted and the block copolymer comprising the polymer block mainly composed of the aromatic vinyl compound and a polymer block mainly composed of the conjugated diene compound or the hydrogenated block copolymer is hardly deteriorated with heat. This is specifically in the range of from 280 to 340° C. Especially, in the case of employing a method wherein a block copolymer and a material mainly composed of polyphenylene ether are fed from the upstream feed opening and melt-kneaded, and thereafter a material mainly composed of polyamide is fed from the downstream feed opening and melt-kneaded, it is desired to set the temperature of the portion from the upstream feed opening to the downstream feed opening at 300 to 340° C., and the temperature of the portion from the downstream feed opening to die at 280 to 300° C.

The thus obtained composition in accordance with the present invention can be molded into molded products used for various parts according to a conventional molding method, such as injection-molding.

Examples of such various parts include motorbike or car electrical device parts, such as a relay box material; electric and electronic parts, such as IC tray materials, chassis for various disk players and cabinets; OA parts and machinery parts, such as various computers and their peripheral devices; exterior parts, such as motorbike cowls and car bumpers, fenders, door panels, various moldings, emblems, outer door handles, door mirror housings, wheel caps, roof rails and their staying materials and spoilers; and interior parts, such as instrument panels, console boxes and trim.

The present invention is described in more detail with reference to Examples and Comparative Examples as follows.

Materials Used

Polyamide as the Component (A):

Polyamide 6,6 resin (hereinafter referred to as PA)

Relative viscosity (98% sulfuric acid/25° C.)=2.7 (JIS K6810)

Concentration of terminal amino group=30 milli-equivalent/kg

Concentration of terminal carboxyl group=100 milli-equivalent/kg

Polyphenylene Ether as the Component (B):

Reduced viscosity=0.42 dl/g (hereinafter referred to as PPE)

Block Copolymer as the Component (C):

(C1-1)

Structure: Polystyrene-hydrogenated polybutadiene-polystyrene

Number average molecular weight=58,000

Number average molecular weight per polystyrene block=19,400

Number average molecular weight of the hydrogenated polybutadiene=19,100

Total content of styrene component=67%

1,2-Vinyl content=41%

Hydrogenation rate of polybutadiene portion=98% or more (C1-2)

Structure: Polystyrene-hydrogenated polybutadiene-polystyrene

Number average molecular weight=77,000

Number average molecular weight per polystyrene block=25,800

Number average molecular weight of hydrogenated polybutadiene=25,400

Total content of styrene component=67% 1,2-Vinyl content=36%

Hydrogenation rate of polybutadiene portion=98% or more (C1-3)

Structure: Polystyrene-hydrogenated polybutadiene-polystyrene

Number average molecular weight=97,000

Number average molecular weight per polystyrene block=29,100

Number average molecular weight of hydrogenated polybutadiene=38,800

Total content of styrene component=60%

1,2-Vinyl content=36%

Hydrogenation rate of polybutadiene portion=98% or more (C1-4)

Structure: Polystyrene-hydrogenated polybutadiene-polystyrene

Number average molecular weight=115,000

Number average molecular weight per polystyrene block=34,500

Number average molecular weight of hydrogenated polybutadiene=46,000

Total content of styrene component=60%

1,2-Vinyl content=35%

Hydrogenation rate of polybutadiene portion=98% or more (C2-1)

Structure: Polystyrene-hydrogenated polybutadiene-polystyrene

Number average molecular weight=40,000

Number average molecular weight per polystyrene block=6,000

Number average molecular weight of hydrogenated polybutadiene=28,000

Total content of styrene component=30%

1,2-Vinyl content=29%

Hydrogenation rate of polybutadiene portion=98% or more (C2-2)

Structure: Polystyrene-hydrogenated polybutadiene-polystyrene

Number average molecular weight=55,000

Number average molecular weight per polystyrene block=8,000

Number average molecular weight of hydrogenated polybutadiene=39,000

Total content of styrene component=29%

1,2-Vinyl content=28%

Hydrogenation rate of polybutadiene portion=98% or more (C2-4)

Structure: Polystyrene-hydrogenated polybutadiene-polystyrene

Number average molecular weight=88,000

Number average molecular weight per polystyrene block=12,300

Number average molecular weight of hydrogenated polybutadiene=63,400

Total content of styrene component=28%

1,2-Vinyl content=32%

Hydrogenation rate of polybutadiene portion=98% or more (C2-5)

Structure: Polystyrene-hydrogenated polyisoprene-polystyrene

Number average molecular weight=100,000

Number average molecular weight per polystyrene block=15,000

Number average molecular weight of hydrogenated polyisoprene=70,000

Total content of styrene component=30%

Hydrogenation rate of polyisoprene portion=98% or more (C2-6)

Structure: Polystyrene-hydrogenated polyisoprene-polystyrene

Number average molecular weight=170,000

Number average molecular weight per polystyrene block=25,500

Number average molecular weight of hydrogenated polyisoprene=119,000

Total content of styrene component=30%

Hydrogenation rate of polyisoprene portion=98% or more (C2-7)

Structure: Polystyrene-hydrogenated polybutadiene-polystyrene

Number average molecular weight=170,000

Number average molecular weight per polystyrene block=29,800

Number average molecular weight of hydrogenated polybutadiene=110,500

Total content of styrene component=35%

1,2-Vinyl content=38%

Hydrogenation rate of polybutadiene portion=98% or more

Paraffinic oil was contained in an amount of 35 weight % or more.

(C2-8)

Structure: Ploystyrene-hydrogenated polybutadiene-polystyrene

Number average molecular weight=250,000

Number average molecular weight per polystyrene block=41,300

Number average molecular weight of hydrogenated polybutadiene=167,500

Total content of styrene component=33%

1,2-Vinyl content=33%

Hydrogenation rate of polybutadiene portion=98% or more

Conductive Material as the Component (D):

Conductive carbon black (hereinafter referred to as CCB)

Trademark: Ketjen black EC-600JD

Polyamide 66/carbon fibril master batch (hereinafter referred to as CF-MB)

Tradename: Polyamide 66 with Fibril™ Nanotubes RMB4620-00: carbon fibril content 20%)

Various evaluation tests shown in the Examples and Comparative Examples were carried out as follows.

(1) Preparation of Test Piece:

As test pieces for tensile test and Izod impact test, TYPE 1 test pieces described in ASTM D638 were prepared using an injection molding machine (PS40E manufactured by Nissei Jushi Kogyo K. K.) at a cylinder temperature of 290° C. and a mold temperature of 80° C. As a test piece for multi-axial impact test, a flat plate of 100 mm×100 mm (2 mm thick) was prepared using an injection molding machine (FS80S manufactured by Nissei Jushi Kogyo K. K.) at a cylinder temperature of 300° C. and a mold temperature of 80° C.

(2) Measurement in Tensile Test and Izod Impact Test:

The tensile test was conducted in accordance with ASTM D638, and the notched Izod impact test was conducted in accordance with ASTM D256.

(3) Measurement in Multi-Axial Impact Test:

In the multi-axial impact test, a falling weight impact test was conducted by falling a striker from a height of 128 cm using a falling weight graphic impact tester (manufactured by Toyo Seiki Co., Ltd.) with a holder diameter of 50 Φmm, a striker diameter of 1 inch and a striker weight of 6.5 kg, thereby measuring a crack initiation energy.

(4) Measurement of Distortion Temperature Under Load (DTUL):

The distortion temperature under load was measured in accordance with ASTM D648 (under loads of 0.45 MPa and 1.82 MPa). The test piece had a thickness of 3 mm.

(5) Measurement of Flowability:

Melt flow rate (MFR) was obtained by measuring a flow per 10 minutes in accordance with ASTM D1238 under the conditions of a temperature of 280° C. and a load of 5 kg.

EXAMPLES 1–3

The cylinder temperature of a twin screw extruder with one feed opening in the upstream, one feed opening in the middle of the extruder and one feed opening in the downstream [ZSK-58MC, manufactured by WERNER & PFLEIDERER, Germany] was set at 320° C. at the portion from the feed opening in the upstream (hereinafter referred to as Main-F) to the feed opening in the middle (hereinafter referred to as Side-F1) and at 280° C. at the portion from the Side-F to a die. In this case, when the total length of the screw was assumed to be 1.0, the position of the Side-F1 was at about 0.55 and the position of the downstream feed opening (hereinafter referred to as Side-F2) was at about 0.75 from the upstream side. Vent ports were provided at the two positions of about 0.35 and about 0.90, and vacuum suction was carried out.

The extruder used above had an L/D of 52 and a screw revolution speed of 900 rpm, and each feeder was adjusted so as to give a discharge rate of 540 kg/h.

Polyphenylene ether and a block copolymer were fed from the Main-F and a polyamide was fed from the Side-F in a proportion as shown in Table 1, and were melt-kneaded to obtain pellets. In this case, 0.5 part by weight of maleic anhydride as a compatibilizer was added together with the polyphenylene ether and the block copolymer. The resulting pellets were molded by the above methods, and the various tests were conducted.

The results are shown in Table 2.

The block copolymer in the form of pellets was fed by a feeder different from the feeder used for feeding the polyphenylene ether, and the powdery block copolymer was premixed with polyphenylene ether and the mixture was fed.

TABLE 1

| Items | Unit | Ex. 1 | Ex. 2 | Ex. 3 |
|---|---|---|---|---|
| PA | Parts by weight | 53 | 53 | 53 |
| PPE | Parts by weight | 36 | 36 | 36 |
| C1-2 | Parts by weight | | | 3 |
| C1-4 | Parts by weight | 3 | 3 | |
| C2-1 | Parts by weight | | 3 | 3 |
| C2-6 | Parts by weight | 8 | | |
| C2-8 | Parts by weight | | 5 | 5 |
| $Mn_{(a)av}$ | g/mol | 28,000 | 29,800 | 27,400 |
| $Mn_{(b)av}$ | g/mol | 99,100 | 96,300 | 90,700 |
| $N_{(C1)}/N_{(C2)}$ | — | 0.55 | 0.27 | 0.41 |

TABLE 2

| Items | Unit | Ex. 1 | Ex. 2 | Ex. 3 |
|---|---|---|---|---|
| Izod Impact Strength | J/m | 751 | 809 | 788 |
| Tensile Elongation | % | 83 | 78 | 92 |
| Multi Axial Impact Strength | J | 48 | 47 | 47 |
| DTUL (0.45 Mpa) | ° C. | 204 | 203 | 204 |
| DTUL (1.82 MPa) | ° C. | 115 | 115 | 125 |

EXAMPLES 4–12

Example 1 was repeated, except that the compositions were changed to those shown in Table 3, and the various tests were conducted. The results are shown in Table 4. In this case, CCB was fed from the Side-F2.

TABLE 3

| Items | Unit | Ex. 4 | Ex. 5 | Ex. 6 | Ex. 7 | Ex. 8 | Ex. 9 | Ex. 10 (Comp.) | Ex. 11 (Comp.) | Ex. 12 (Comp.) |
|---|---|---|---|---|---|---|---|---|---|---|
| PA | parts by weight | 53 | 53 | 53 | 53 | 53 | 53 | 53 | 53 | 53 |
| PPE | parts by weight | 38 | 38 | 38 | 38 | 38 | 38 | 38 | 38 | 38 |
| CCB | parts by weight | 1.5 | 1.5 | 1.5 | 1.5 | 1.5 | 1.5 | 1.5 | 1.5 | 1.5 |
| C1-1 | parts by weight | 2 | | | | | | | | |
| C1-3 | parts by weight | | 2 | 2 | 2 | 3 | 4 | 6 | 6 | 3 |
| C2-4 | parts by weight | 7 | | | 7 | 6 | 5 | 3 | 3 | |
| C2-5 | parts by weight | | | 7 | | | | | | |
| C2-7 | parts by weight | | 7 | | | | | | | |
| C2-8 | parts by weight | | | | | | | | | 6 |
| $Mn_{(a)av}$ | g/mol | 13,900 | 29,600 | 18,100 | 16,000 | 17,900 | 19,800 | 23,500 | 38,600 | 37,200 |
| $Mn_{(b)av}$ | g/mol | 53,500 | 94,600 | 63.100 | 57,900 | 55,200 | 52,400 | 47,000 | 139,000 | 125,000 |
| $N_{(C1)}/N_{(C2)}$ | — | 0.44 | 0.50 | 0.29 | 0.26 | 0.45 | 0.73 | 1.81 | 0.74 | 1.29 |

TABLE 4

| Items | Unit | Ex. 4 | Ex. 5 | Ex. 6 | Ex. 7 | Ex. 8 | Ex. 9 | Ex. 10 (Comp.) | Ex. 11 (Comp.) | Ex. 12 (Comp.) |
|---|---|---|---|---|---|---|---|---|---|---|
| Izod Impact Strength | J/m | 204 | 190 | 180 | 196 | 190 | 182 | 104 | 183 | 159 |
| Tensile Elongation | % | 63 | 49 | 58 | 62 | 63 | 60 | 52 | 43 | 46 |
| Multi Axial Impact Strength | J | 47 | 20 | 40 | 48 | 47 | 40 | 15 | 13 | 10 |
| DTUL (0.45 Mpa) | ° C. | 214 | 210 | 212 | 212 | 210 | 212 | 210 | 211 | 211 |
| DTUL (1.82 MPa) | ° C. | 120 | 106 | 110 | 111 | 120 | 125 | 129 | 121 | 123 |
| MFR | g/10 min | 32 | 31 | 27 | 27 | 28 | 29 | 25 | 24 | 28 |

EXAMPLE 13

Thirty-eight Parts by weight of polyphenylene ether, 2 parts by weight of C1-3, and 7 parts by weight of C2-4 were fed from the Top-F, 47 parts by weight of a polyamide was fed from the Side-F1, and 7.5 parts by weight of CF-MB was fed from the Side-F2, and they were melt kneaded to obtain pellets. The substantial composition of the pellets in this case corresponded to the composition of Example 7 in which CCB was changed to carbon fibril (CF).

The resulting pellets were molded, and the multi-axial impact strength of the composition was measured to obtain 53J. Furthermore, the tensile elongation was 100% or more.

The composition of the present invention can be markedly improved in impact characteristics corresponding to crash of cars, falling of containers, etc., particularly, tensile elongation and multi-axial impact strength, while retaining the flowability and heat resistance, as compared with conventional techniques.

What is claimed is:

1. A thermoplastic resin composition, comprising;
   (A) 50 to 90 parts by weight of a polyamide,
   (B) 50 to 10 parts by weight of a polyphenylene ether, and
   (C) 1 to 35 parts by weight of a block copolymer comprising at least one polymer block mainly composed of an aromatic vinyl compound and at least one polymer block mainly composed of a conjugated diene compound and/or the block copolymer which is hydrogenated,
   the amount of the component (C) being with respect to 100 parts by weight of the sum of (A) and (B),
   wherein the component (C) is a mixture of two or more block copolymers comprising (C1) a block copolymer containing a polymer block mainly composed of an aromatic vinyl compound in an amount of 55 weight % or more but less than 90 weight % and (C2) a block copolymer containing a polymer block mainly composed of an aromatic vinyl compound in an amount of 20 weight % or more but less than 55 weight %, and one of the polymer block mainly composed of an aromatic vinyl compound in the mixture has a number average molecular weight of 10,000 or more but less than 30,000 and one of the polymer block mainly composed of a conjugated diene compound in the mixture has a number average molecular weight of 50,000 or more but less than 100,000.

2. The thermoplastic resin composition according to claim 1, wherein the component (C) is the hydrogenated block copolymer comprising at least two polymer blocks mainly composed of an aromatic vinyl compound and at least one polymer block mainly composed of a conjugated diene compound.

3. The thermoplastic resin composition according to claim 1, wherein one of the polymer block mainly composed of an aromatic vinyl compound in the mixture of two or more block copolymers of the component (C) has a number average molecular weight of 10,000 or more but less than 25,000 and one of the polymer block mainly composed of a conjugated diene compound in the mixture has a number average molecular weight of 50,000 or more but less than 80,000.

4. The thermoplastic resin composition according to claim 1, wherein the component (C) is a mixture consisting of the block copolymers having a number average molecular weight of less than 120,000.

5. The thermoplastic resin composition according to claim 1, wherein the molar ratio of the component (C1) and the component (C2), $N_{(C1)}/N_{(C2)}$, is in the range of 0.2 to 1.0.

6. The thermoplastic resin composition according to claim 1, further comprising a conductive material as a component (D) in an amount of less than 3 parts by weight with respect to 100 parts by weight of the sum of the components (A)–(C).

7. An injection-molded product, comprising the thermoplastic resin composition according to claim 1.

* * * * *